United States Patent [19]  [11] 4,231,636
Abe  [45] Nov. 4, 1980

[54] VARIABLE FIELD CURVATURE LENS SYSTEM

[75] Inventor: Haruo Abe, Sakai, Japan

[73] Assignee: Minolta Camera Kabushiki Kaisha, Osaka, Japan

[21] Appl. No.: 926,196

[22] Filed: Jul. 19, 1978

Related U.S. Application Data

[63] Continuation of Ser. No. 723,888, Sep. 16, 1976, abandoned.

[51] Int. Cl.³ .......................... G02B 9/16; G02B 15/18
[52] U.S. Cl. ............................. 350/175 FS; 350/184; 350/188; 350/226
[58] Field of Search ................. 350/175 ES, 184, 186, 350/226, 214, 188

[56] References Cited

U.S. PATENT DOCUMENTS 1,865,977  7/1932  Sonnefeld .................. 350/175 FS X
3,782,829  1/1974  Herriott ..................... 350/175 FS X
3,904,275  9/1975  Noguchi et al. ............... 350/175 FS Primary Examiner—Paul A. Sacher
Attorney, Agent, or Firm—Jackson, Jones & Price

[57] ABSTRACT

An optical lens system is provided having the capability of selectively varying the peripheral field curvature to improve focusing for nonplanar objects and for special photographic effects. The lens system can include in sequence, a first lens group of positive refractive power, a second lens group of negative refractive power and a third lens group of positive refractive power. The specific refractive power of the first and second lens group are designed so that the optical ray traces from an object on the optical axis at infinity will run approximately parallel with the optical axis in the space between the second and third lens groups. The first and second lens groups being movable as a unit relative to the third lens group to change the field curvature without varying the back focal distance of the lens system.

9 Claims, 21 Drawing Figures

Spherical Aberration

Fig.2b

Spherical Aberration

Fig.2c

Spherical Aberration

Astigmatism

Astigmatism

Astigmatism

Fig.3a

Spherical Aberration

Fig.3b

Spherical Aberration

Fig.3c

Spherical Aberration

Astigmatism

Astigmatism

Astigmatism

Spherical Aberration

Fig.5b

Spherical Aberration

Fig.5c

Spherical Aberration

Astigmatism

Astigmatism

Astigmatism

Fig.6a

$\Delta d\,14 = -0.05$
$\Delta d\,18 = +0.05$

Spherical Aberration

Fig.6b

$\Delta d\,14 = 0.0$
$\Delta d\,18 = 0.0$

Spherical Aberration

Fig.6c

$\Delta d\,14 = +0.05$
$\Delta d\,18 = -0.05$

Spherical Aberration

Astigmatism

Astigmatism

Astigmatism

Fig.7

Fig.8a
$\Delta d_4 = -0.06$

Spherical Aberration

Fig.8b
$\Delta d_4 = 0.0$

Spherical Aberration

Fig.8c
$\Delta d_4 = +0.06$

Spherical Aberration

Astigmatism

Astigmatism

Astigmatism

Fig.9a  
$\Delta d_4 = -0.06$

Spherical Aberration

Fig.9b  
$\Delta d_4 = 0.0$

Spherical Aberration

Fig.9c  
$\Delta d_4 = +0.06$

Spherical Aberration

Astigmatism

Astigmatism

Astigmatism

VARIABLE FIELD CURVATURE LENS SYSTEM

RELATED APPLICATIONS

This is a continuation application of Ser. No. 723,888 filed on Sept. 16, 1976, now abandoned.

BACKGROUND OF THE INVENTION

1. Field of the Invention

The present invention relates to an optical lens system and more particularly to an improved variable field curvature lens system.

2. Description of the Prior Art

Recently a relatively fast wide angle lens system was introduced in the commercial photography field. The design parameters of this system permitted the introduction of a variable field curvature (VFC) to render an object in sharp focus on the film plane, even though the object depth of field may be concave or convex relative to the flat image plane.

Ordinary photographic objective lenses are designed and aberrationally corrected so that all points in a perpendicular plane at which the lens is focused will appear sharp on the film. In practice, however, objects to be photographed are rarely confined to such a plane. Usually subjects are three dimensional with parts located at various distances from the camera. With the ordinary SLR flat-field objectives, the photographer has only the depth of field, which can be obtained from stopping down the lens, to rely upon to render such subjects or parts thereof in sharp focus. The variable field curvature lens permitted an object to be placed in focus not only along the optical axis but also the marginal or off axis points of the object can be placed in focus by a continuous changing of the curvature of field from flat to concave or to convex through the adjustment of a control ring on the barrel. This capability of permitting the varying of the curvature of field allows the photographer to achieve a sharp focus for rounded, recessed or other three dimensional subjects without relying solely upon the depth of field.

The photographer would also have the ability of using this bulging or recessed field to creatively render primarily two dimensional subjects deliberately out of focus at the center or around the edges of the field of view. This lens system further utilized a "floating" focusing system, in which relative movement of lens components were varied independently to provide edge to edge sharpness even at the closest focusing distances at full aperture. This automatic correction was operative and effective with either a flat field or any curvature introduced into the field to provide top image quality whether the lens was used as a special variable field curvature lens system or as an ordinary wide angle lens.

A mechanism for focusing a variable field curvature lens is disclosed in the U.S. Pat. No. 3,904,275. Additional relevant prior art can be found in a Japanese publicly available published patent application disclosure No. 48-2823, 1973 and the German Offenlegungsschrift No. 2224429, 1972.

A practical application for a variable field curvature lens system can be found in the television industry. Traditionally the light receptive surfaces of the ordinary image or vidicon tubes, have been flat. In attempting to record an object scene having considerable depth or an object scene wherein the prominent object features are curved, it is necessary to utilize a lens system that would provide a flat image plane for a curved object on the image tube.

Conversely, certain recent image tubes, for example, the highly sensitive image tube developed by Tokyo Shibaura Electric Company, Ltd., known as the SEM tube, have utilized light receptive surfaces which are curved. In this regard, it is necessary to bring a flat object scene into focus on a curved image light receptive surface. A suggested alternative comprises the use of an ordinary lens system and optical fiber elements to carry the flat image formed by the ordinary lens system to the curved light receptive surface, but such device would add considerable to the total cost of the video system.

Generally, the above variable field curvature lens systems have utilized at least two groups of lenses, front and rear, for ordinary focusing purposes. During focusing, the front and rear groups are shifted at a predetermined relatively different rate to prevent change of the curvature of field while for the purpose of introducing a variable curvature, the front lens group alone will be shifted along the optical axis. As can be appreciated, the front lens group must then be provided with a means of shifting it at a predetermined speed ratio with respect to the rear lens group and further a different mechanism for selectively shifting the front lens group alone during a VFC operation. This dual requirement complicates the construction and manufacturing of a variable field curvature lens system and accordingly increases its cost in an already extremely cost competitive photography field.

A relatively simple and cost competitive VFC lens system is still an object of the prior art.

SUMMARY OF THE INVENTION

It is an object of the present invention to provide an improved variable field curvature lens system which permits the variation of the field curvature independent of any automatic compensation of the field curvature during a focusing operation.

It is another object of the present invention to provide a variable field curvature lens system wherein the relative positions of a first and second lens group can be held constant during a focusing operation and can be manually varied to permit the introduction of variable field curvature.

It is still another object of the present invention to provide a variable field curvature lens system wherein at least two relatively movable lens groups have complimentarily refractive powers to permit an optical ray trace from an object at infinity to parallel the optical axis as it exists from the image side lens group.

It is a final object of the present invention to permit the two relatively movable lens groups to be moved along the optical axis as a single unit relative at least a third lens group without varying the total back focal length of the lens system.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE PREFERRED EMBODIMENT

The following description is provided to enable any person skilled in the optical art to make and use the invention and sets forth the best mode contemplated by the inventor of carrying out his invention. Various modifications, however, will remain readily apparent to those skilled in the art, since the generic principles of the present invention have been defined herein specifically to provide an improved variable field curvature lens system that can be manufactured in a relatively economical manner.

The derivation of the lens parameters set forth herein can be accomplished with the assistance of a computer. The present invention represents the parameters of a compromised balance of acceptable aberrations in a relatively easily manufactured and low cost lens system for utilization, for example, with a single lens reflex camera.

Figure 1:
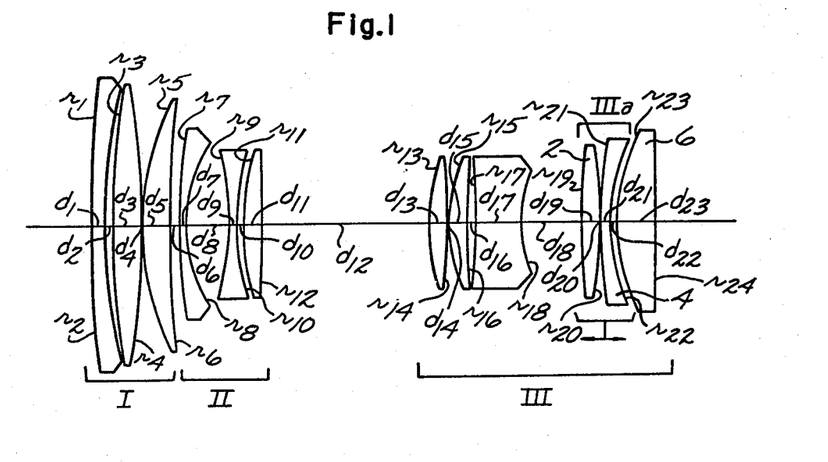
FIG. 1 is a schematic cross-sectional view of the first embodiment of a variable field curvature lens system capable of providing a variable focal length.

Referring to FIG. 1, a zoom lens system is disclosed incorporating an improved variable field curvature feature of the present invention. As can be readily appreciated, FIG. 1 simply represents a schematic view with the conventional characteristics of an object on the left and the desired image plane being created on the right. The reference symbol I designates a positive refracting front lens group while symbol II designates a negatively refracting variator lens group movable in accordance with Table I during a zoom operation. The lens group, III is a positively refracting compensator lens which also serves the function of a relay lens. Lens group III is further divided into a sub-group IIIA of a first lens element 2 having a positive refractive power, $r_{19}$ and $r_{20}$ and a second lens element 4 of a negative refractive power, $r_{21}$ and $r_{22}$, which can be moved as a unit relative to the remaining lenses in the compensator lens group III. A third lens element 6 of positive refractive power, $r_{23}$ and $r_{24}$, is located adjacent to the image side of the movable second lens element 4.

A conventional optical ray trace in the air spaces both before and after the sub-group IIIA would disclose parallel ray traces relative to the optical axis. By shifting the compensator lens sub-group IIIA along the optical axis, the total curvature of field for the lens system can be continuously and selectively varied while the actual point of intersection between the image plane and the optical axis can be kept stationary or unshifted. Thus, the variable field curvature feature of the present invention can be accomplished by a subcomponent lens of the variable lens group of the zoom lens system.

To focus the lens system, either the positive refracting lens group I alone or the entire lens assembly is shifted along the optical axis. During the focusing operation, the relative position of the sub-group IIIA is maintained constant with respect to the other lenses in group III. The specific parameters of this lens design is set forth in the following Table 1. In this table, r, represents the radius of curvature, d is the axial distance along the optical axis, N is the index of refraction and $\nu$ is the Abbe Number. The sub-numbers refer to consecutive measurements from the left to the right of the lens system. The axial distance includes both the thickness of the lenses and the air spaces along the optical axis.

TABLE 1

Embodiment 1

$f = 1.0 \sim 2.0$ Aperture Ratio 1:2.8
Field Angle $2\omega = 59° \sim 29.5°$ Back Focal Length $= 1.0 \sim 1.1$

| | | Radius of Curvature | Axial Distance | Refractive Index | Abbe Number |
|---|---|---|---|---|---|
| I | $r_1$ | 5.9044 | | | |
| | | | $d_1$ 0.0485 | $N_1$ 1.8052 $\nu_1$ | 25.4 |
| | $r_2$ | 2.3931 | | | |
| | | | $d_2$ 0.0472 | | |
| | $r_3$ | 4.3588 | | | |
| | | | $d_3$ 0.1206 | $N_2$ 1.5168 $\nu_2$ | 64.0 |
| | $r_4$ | −3.4691 | | | |
| | | | $d_4$ 0.0029 | | |
| | $r_5$ | 1.2381 | | | |
| | | | $d_5$ 0.1189 | $N_3$ 1.5168 $\nu_3$ | 64.0 |
| | $r_6$ | 5.1534 | | | |
| | | | $d_6$ 0.0307–0.5545 (Variable) | | |
| II | $r_7$ | 2.2718 | | | |
| | | | $d_7$ 0.0320 | $N_4$ 1.6783 $\nu_4$ | 49.1 |
| | $r_8$ | 0.6609 | | | |
| | | | $d_8$ 0.1928 | | |
| | $r_9$ | −0.9566 | | | |
| | | | $d_9$ 0.0302 | $N_1$ 1.5714 $\nu_5$ | 52.9 |
| | $r_{10}$ | 1.0845 | | | |
| | | | $d_{10}$ 0.0225 | | |
| | $r_{11}$ | 1.1160 | | | |
| | | | $d_{11}$ 0.0856 | $N_6$ 1.8052 $\nu_6$ | 25.4 |
| | $r_{12}$ | −12.4894 | | | |
| | | | $d_{12}$ 0.7141–0.0712 (Variable) | | |
| III | $r_{13}$ | 0.8632 | | | |
| | | | $d_{13}$ 0.0787 | $N_7$ 1.6935 $\nu_7$ | 51.7 |
| | $r_{14}$ | −26.7543 | | | |
| | | | $d_{14}$ 0.0030 | | |
| | $r_{15}$ | 0.7038 | | | |
| | | | $d_{15}$ 0.0876 | $N_8$ 1.6587 $\nu_8$ | 57.1 |
| | $r_{16}$ | 4.2847 | | | |
| | | | $d_{16}$ 0.0279 | | |
| | $r_{17}$ | −3.7052 | | | |
| | | | $d_{17}$ 0.1935 | $N_9$ 1.6889 $\nu_9$ | 31.1 |
| | $r_{18}$ | 0.5018 | | | |
| | | | $d_{18}$ 0.2642 | | |
| IIIa | $r_{19}$ | 2.4346 | | | |
| | | | $d_{19}$ 0.0791 | $N_{10}$ 1.6583 $\nu_{10}$ | 53.4 |
| | $r_{20}$ | −1.7323 | | | |
| | | | $d_{20}$ 0.0024 | | |
| | $r_{21}$ | 2.2657 | | | |
| | | | $d_{21}$ 0.0320 | $N_{11}$ 1.7569 $\nu_{11}$ | 29.7 |
| | $r_{22}$ | 0.7745 | | | |
| | | | $d_{22}$ 0.0312 | | |

TABLE 1-continued

Embodiment 1 f = 1.0~2.0 Aperture Ratio 1:2.8
Field Angle 2ω = 59°~29.5° Back Focal Length = 1.0~1.1

| Radius of Curvature | Axial Distance | Refractive Index | Abbe Number |
|---|---|---|---|
| $r_{23}$ 0.8114 | | | |
| | $d_{23}$ 0.1697 | $N_{12}$ 1.6910 | $v_{12}$ 54.8 |
| $r_{24}$ −47.1560 | | | |

Figure 2A:
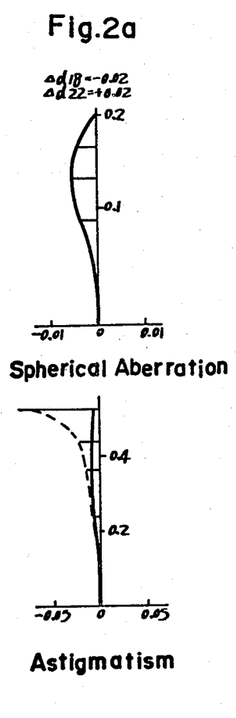
FIGS. 2a, 2b and 2c are graphical plots of respectively the spherical aberration and astigmatism of an operative first embodiment of the invention.
Figure 2B:
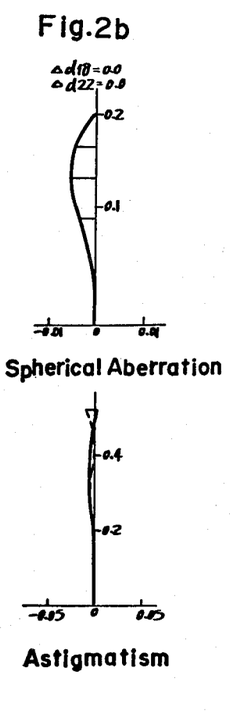
Figure 2C:
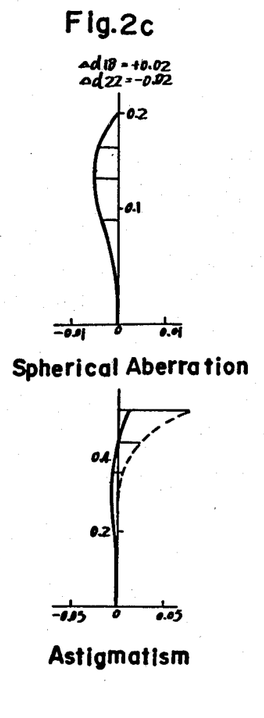

The aberrations produced by the first embodiment disclosed in Table 1 is set forth in a series of graphical plots in FIGS. 2a, 2b and 2c. These respective figures disclose the spherical aberration and the astigmatism, with f=1.0, for various positions of the lens subcomponent IIIA. FIG. 2a are the graphical plots corresponding to when the lens subcomponent IIIA is shifted to vary the axial distances $d_{18}$ and $d_{22}$ by a −0.02 and a +0.02 respectively. FIG. 2b discloses the spherical aberration and astigmatism for the same embodiment when the axial distances are set forth as in Table 1 above. Finally, FIG. 2c discloses the spherical aberration and astigmatism corresponding to a position of the lens subcomponent IIIA shifted to $d_{18}$=+0.02 and $d_{22}$=−0.02.

A comparison of FIGS. 2a, 2b and 2c discloses that the off-axial image plane shifts forward and backward (See respective astigmatisms.) without being accompanied by any change in the spherical aberration.

Figure 3A:
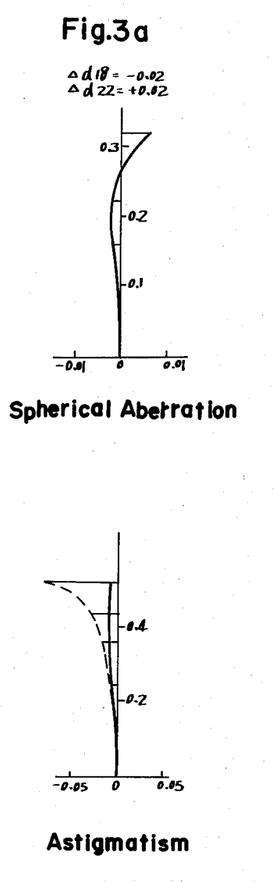
FIGS. 3a, 3b and 3c are likewise graphical plots of respectively, the spherical aberration and astigmatism for a different focal length of the first embodiment.
Figure 3B:
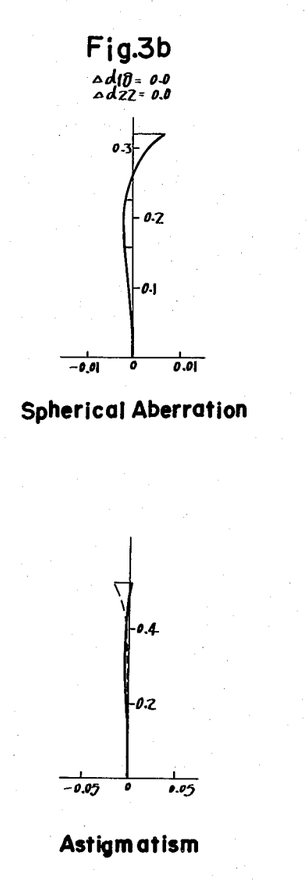
Figure 3C:
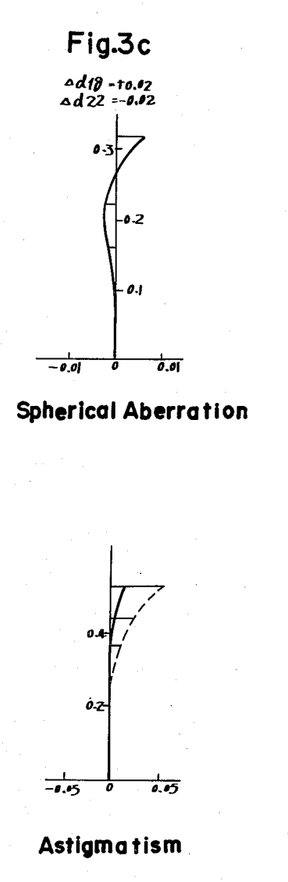

The graphical plots of the spherical aberration and astigmatism in FIGS. 3a, 3b and 3c are provided to disclose that the off-axial image plane shift or variation in field curvature is independent of the focal length setting of the zoom lens system of embodiment 1. In this regard the respective graphical representations of each of the aberrations correspond to the first series of plots, yet f is now equal to 2. In FIG. 3a, $d_{18}$ and $d_{22}$ are again varied as in FIG. 2a by a respective −0.02 and a +0.02. FIG. 3b represents the axial distances as set forth in Table 1. FIG. 3c represents the lens positions when $d_{18}$ is varied by a +0.02 and $d_{22}$ is varied by a −0.02.

Again comparing the graphical plots, it can be seen that the off-axis image plane will shift forward and backward without any significant change in the spherical aberration. Thus, the same effects can be achieved with respect to the introduction of a variable field curvature independent of the respective focal length setting of the zoom lens embodiment of Table 1.

Figure 4:
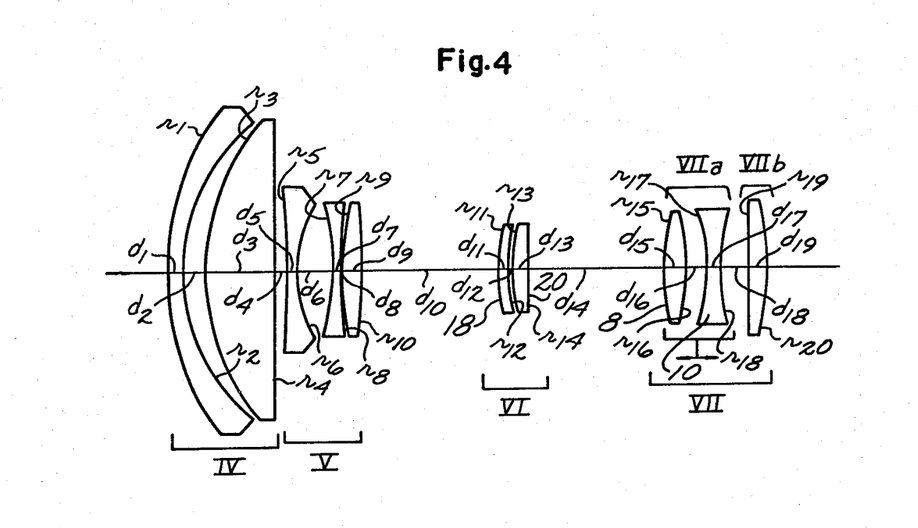
FIG. 4 is a schematic cross-sectional view of a second embodiment of the present invention as a zoom lens system.

A second embodiment of the present invention is disclosed as a zoom lens system in FIG. 4.

Symbol IV refers to a positively refracting focusing lens group, symbol V refers to a negatively refracting variator lens group, symbol VI movable with Table II during a zoom operation, refers to a positively refracting compensator lens group and symbol VII refers to a positively refracting relay lens group. The relay lens group VII is further divided into a sub-group, VIIa and lens element VIIb. VIIb is a third lens element of positive refractive power $r_{19}$ and $r_{20}$, located adjacent to the image side of a second lens element 10 of sub-group VIIa. The compensator lens group includes an object side lens element 18 of negative refractive power and an image side lens element 20 of positive refractive power.

In the air spaces both before and after the lens sub-group VIIa, the optical ray traces are parallel with the optical axis for an object at infinity. To vary the curvature of field continuously, while maintaining the point of intersection between the image plane and the optical axis unshifted, the sub-lens group VIIa comprising a first lens element 8 of positive refractive power, and the second lens element 10 of negative refractive power, is shifted along the optical axis.

The specific lens parameters of the lens system of FIG. 4 are disclosed in the following Table 2.

Figure 5A:
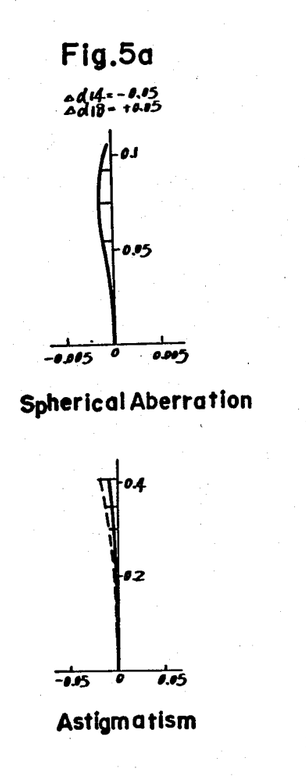
FIGS. 5a, 5b and 5c are graphical plots of respectively the spherical aberration and astigmatism of an operative second embodiment.
Figure 5B:
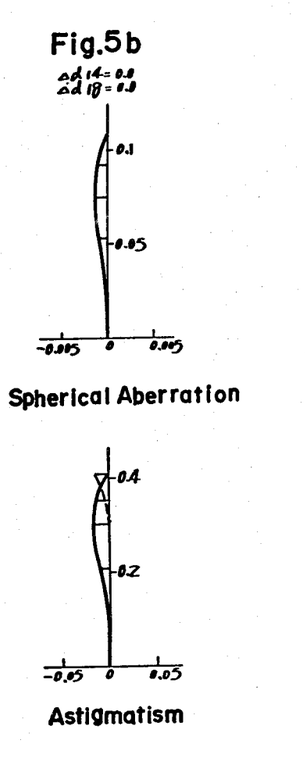
Figure 5C:
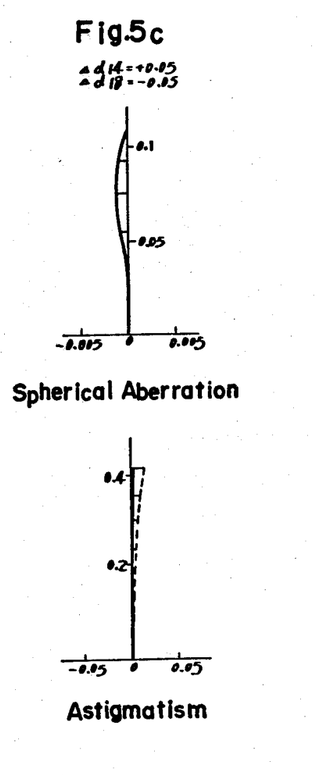

The aberrations produced by the second embodiment of the invention disclosed in Table 2 are set forth in a series of graphical plots in FIGS. 5a, 5b and 5c. These respective figures disclose the spherical aberration and astigmatism, for f=1.0, for various positions of the lens subcomponent VIIa. FIG. 5a are the graphical plots corresponding to the lens subcomponents VIIa shifted to vary the axial distances $d_{14}$ and $d_{22}$ by −0.05 and +0.05 respectively. FIG. 5b discloses the spherical aberration and astigmatism corresponding to a position of the lens subcomponent VIIa shifted to $d_{14}$=+0.05 and $d_{18}$=−0.05.

TABLE 2

Embodiment 2 f = 1.0~2.0 Aperture Ratio 1:4.5
Field Angle 2ω = 47°~24° Back Focal Length = 1.2

| | | Radius of Curvature | Axial Distance | Refractive Index | Abbe Number |
|---|---|---|---|---|---|
| IV | | $r_1$ 1.2951 | | | |
| | | | $d_1$ 0.0619 | $N_1$ 1.8052 | $v_1$ 25.4 |
| | | $r_2$ 0.8635 | | | |
| | | | $d_2$ 0.0813 | | |
| | | $r_3$ 0.9050 | | | |
| | | | $d_3$ 0.3081 | $N_2$ 1.6700 | $v_2$ 57.1 |
| | | $r_4$ ∞ | | | |
| | | | $d_4$ 0.0452–0.6149 (Variable) | | |
| | | $r_5$ −11.9533 | | | |
| | | | $d_5$ 0.0465 | $N_3$ 1.7170 | $v_3$ 48.1 |
| | | $r_6$ 0.5006 | | | |
| | | | $d_6$ 0.1613 | | |
| | | $r_7$ −0.9580 | | | |
| | | | $d_7$ 0.0387 | $N_4$ 1.7212 | $v_4$ 38.0 |
| | | $r_8$ 11.8360 | | | |
| V | | | $d_8$ 0.0039 | | |
| | | $r_9$ 1.1770 | | | |
| | | | $d_9$ 0.0774 | $N_5$ 1.8052 | $v_5$ 25.4 |
| | | $r_{10}$ −2.8330 | | | |
| | | | $d_{10}$ 0.5866–0.0794 (Variable) | | |
| | | $r_{11}$ 0.7287 | | | |

TABLE 2-continued

Embodiment 2 f = 1.0~2.0 Aperture Ratio 1:4.5

Field Angle 2ω = 47°~24° Back Focal Length = 1.2

| | | | Radius of Curvature | Axial Distance | Refractive Index | Abbe Number |
|---|---|---|---|---|---|---|
| VI | | $r_{12}$ | 0.5445 | $d_{11}$ 0.0387 | $N_6$ 1.7212 $\nu_6$ | 38.0 |
| | | | | $d_{12}$ 0.0126 | | |
| | | $r_{13}$ | 0.8256 | | | |
| | | | | $d_{13}$ 0.0665 | $N_7$ 1.6779 $\nu_7$ | 55.4 |
| | | $r_{14}$ | 11.3668 | | | |
| | | | | $d_{14}$ 0.5840–0.5215 (Variable) | | |
| VII | VIIIa | $r_{15}$ | 0.8782 | | | |
| | | | | $d_{15}$ 0.0993 | $N_8$ 1.6779 $\nu_8$ | 55.4 |
| | | $r_{16}$ | −0.9042 | | | |
| | | | | $d_{16}$ 0.0954 | | |
| | | $r_{17}$ | −0.6783 | | | |
| | | | | $d_{17}$ 0.0672 | $N_9$ 1.7618 $\nu_9$ | 26.6 |
| | | $r_{18}$ | 0.9656 | | | |
| | | | | $d_{18}$ 0.0972 | | |
| | VIIb | $r_{19}$ | 6.7646 | | | |
| | | | | $d_{19}$ 0.0848 | $N_{10}$ 1.7545 $\nu_{10}$ | 32.8 |
| | | $r_{20}$ | −0.9498 | | | |

Figure 6A:
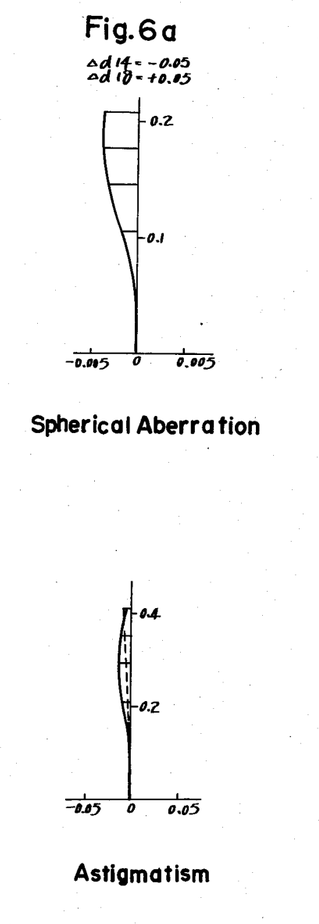
FIGS. 6a, 6b and 6c are likewise a graphical plot of respectively the spherical aberration and astigmatism for a different focal length of the second embodiment.
Figure 6B:
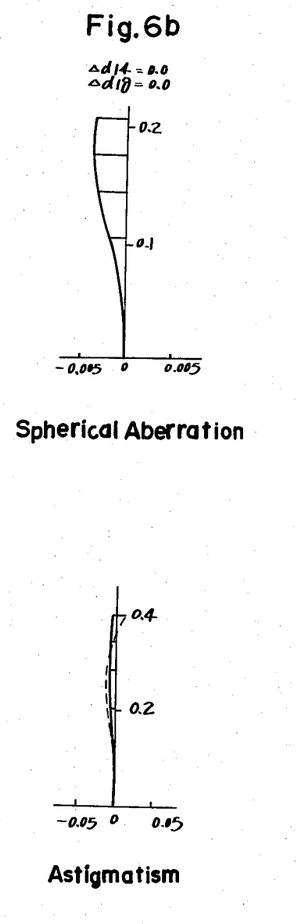
Figure 6C:
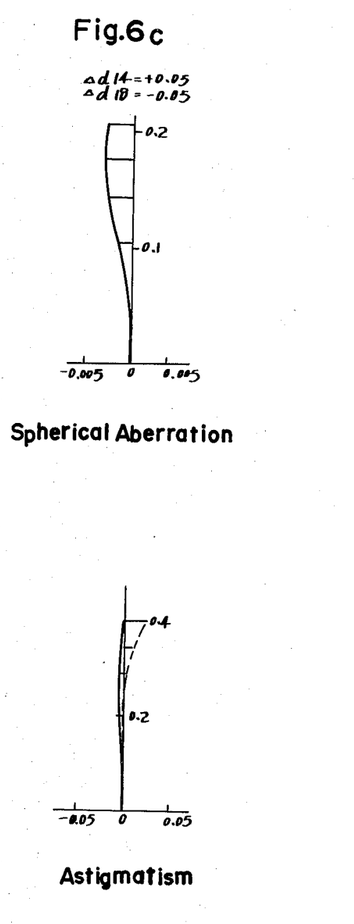

The graphical plots of the spherical aberration and astigmatism in FIGS. 6a, 6b and 6c are provided to disclose that any variation in field curvature is independent of the focal length setting of the zoom lens system of the second embodiment. In this regard, the respective graphical representations of each of the aberrations correspond to the first series of plots of FIG. 5 but with a focal length setting of f=2.0.

By comparing the graphical plots in FIGS. 5a, 5b and 5c or in FIGS. 6a, 6b and 6c, it can be seen that the off axis image plane will shift forward and backward without any significant change in the spherical aberration. In addition, this introduction of a field curvature is independent of the respective focal length setting of the zoom lens embodiment of Table 2.

Figure 7:
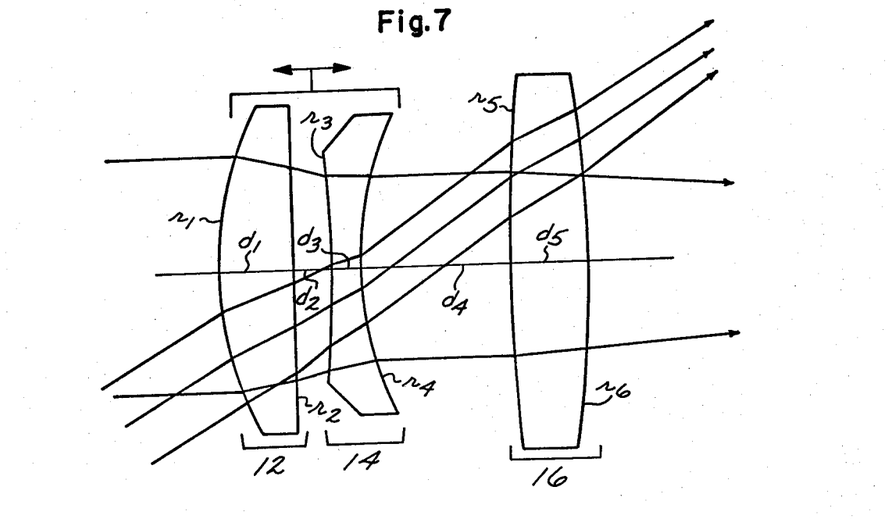
FIG. 7 is a schematic cross-sectional view of a third embodiment of the present invention in the form of a triplet lens system.

FIG. 7 discloses a schematic triplet lens system as the third embodiment of the present invention. This lens system consists of the following three elements: a positively refracting lens element 12 and a negatively refracting lens element 14 forming a front lens group and finally a positively refracting lens element 16. The front lens group can shift along the optical axis to vary the curvature of field continuously as desired without shifting the point of intersection between the image plane and the optical axis. Focusing can be achieved by the relative movement of the positive lens element 12 to that of the remaining lenses in the optical system. When an object is focused at infinity, the ray traces in the air space between the lens element 14 and the positive lens element 16 are parallel to the optical axis. The respective lens parameters of the third embodiment are set forth in the following Table 3.

TABLE 3

Embodiment 3 f = 1.0 Aperture Ratio 1:8

Field Angle 2ω = 47° Back Focal Length = 0.8

| | Radius of Curvature | Axial Distance | Refractive Index | Abbe Number |
|---|---|---|---|---|
| $r_1$ | 0.2062 | | | |
| | | $d_1$ 0.0451 | $N_1$ 1.6172 | $\nu_1$ 54.0 |
| $r_2$ | −4.5450 | | | |
| | | $d_2$ 0.0228 | | |
| $r_3$ | −0.7751 | | | |
| | | $d_3$ 0.0177 | $N_2$ 1.6206 | $\nu_2$ 38.3 |
| $r_4$ | 0.2014 | | | |
| | | $d_4$ 0.0925 | | |
| $r_5$ | 1.2638 | | | |

TABLE 3-continued

Embodiment 3 f = 1.0 Aperture Ratio 1:8

Field Angle 2ω = 47° Back Focal Length = 0.8

| | Radius of Curvature | Axial Distance | Refractive Index | Abbe Number |
|---|---|---|---|---|
| | | $d_5$ 0.0462 | $N_3$ 1.6172 | $\nu_3$ 54.0 |
| $r_6$ | −0.7462 | | | |

Figure 8A:
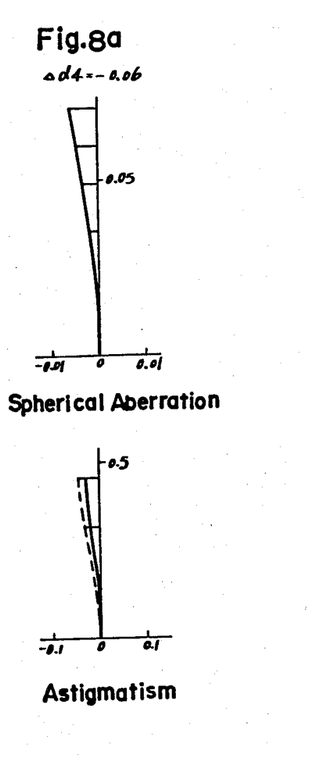
FIGS. 8a, 8b and 8c are graphical plots of respectively the spherical aberration and astigmatism for an operative third embodiment.
Figure 8B:
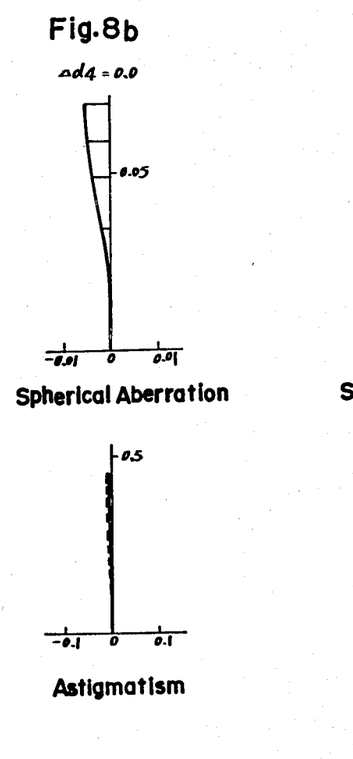
Figure 8C:
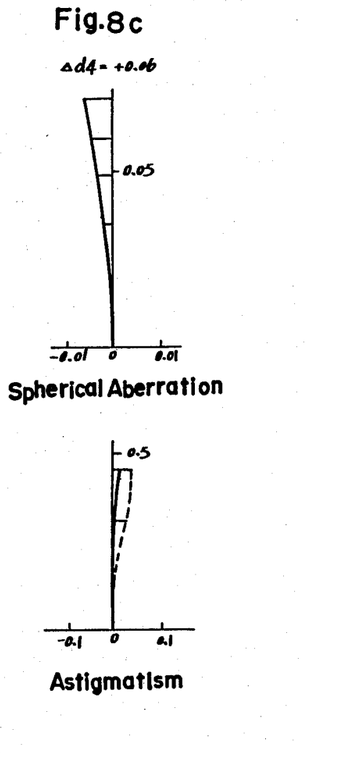

FIGS. 8a, 8b and 8c set forth a series of graphical plots for spherical aberration and astigmatism when the lens system is focused at infinity and lens elements 12 and 14 are relatively shifted together to vary the dimension $d_4$. FIG. 8a corresponds to a case with a variation of $\Delta d_4 = -0.06$. FIG. 8b corresponds to the dimensional position set forth in Table 3, while FIG. 8c corresponds to the variation of a $\Delta d_4 = -0.06$.

Figure 9A:
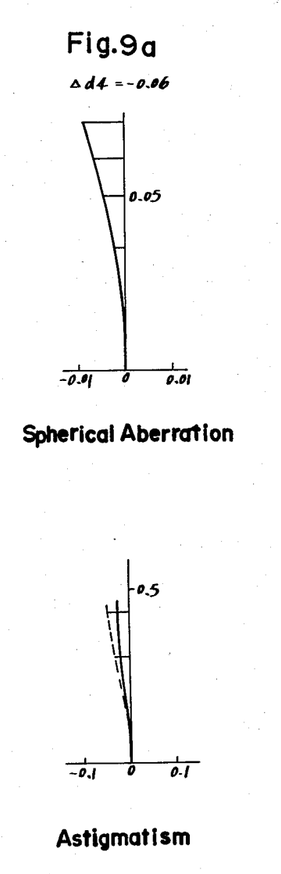
FIGS. 9a, 9b and 9c are likewise graphical plots of respectively the spherical aberration and astigmatism for a different focal length of the third embodiment of the present invention.
Figure 9B:
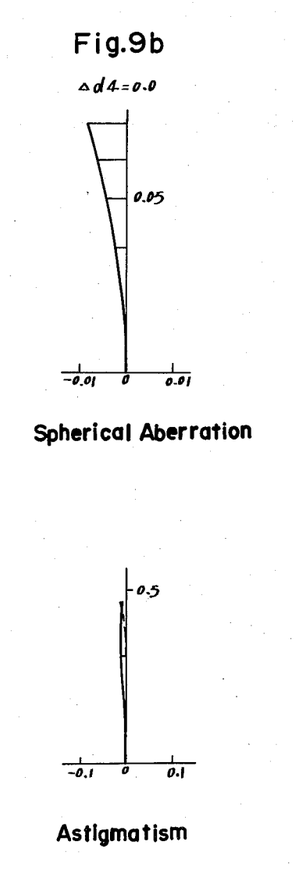
Figure 9C:
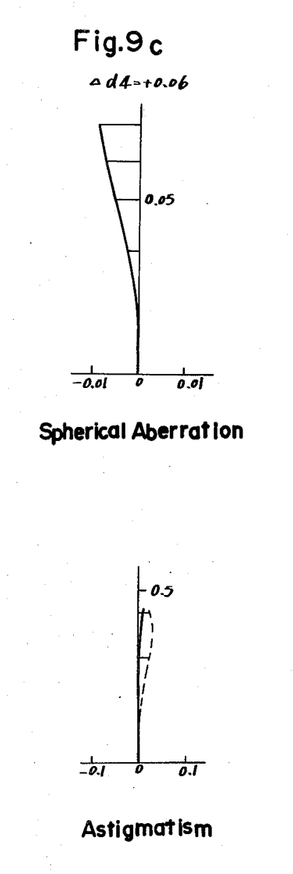

FIGS. 9a, 9b, and 9c are cited to disclose the advantages of the present invention can be realized irrespective of the objective distance settings. In this regard, the spherical aberration and astigmatism plotted in FIG. 9 disclose the positive lens element 12 focused at an object distance of two meters along the optical axis. In FIG. 9a, the dimension $d_4$ has been varied by $\Delta d_4 = -0.06$. In FIG. 9b, the spherical aberration and astigmatism are shown when $\Delta d_4 = 0.0$. Finally, in FIG. 9c, the spherical aberration and astigmatism correspond to $\Delta d_4 = +0.06$. A comparison of the respective aberrations for FIGS. 8a, 8b and 8c or for FIGS. 9a, 9b and 9c disclose that the off axial image plane shifts forward and backward without being accompanied by any change in the spherical aberration. In addition, this introduction of a field curvature is independent of the respective focusing.

Each of the lens systems disclosed in the three embodiments of the present invention set forth herein, can be utilized as follows. When a photographer wishes to render a curved object in focus without resorting to a change in the depth of field he first focuses the lens system on the central part or median area of the subject matter. Then the photographer can vary the field curvature to adjust the image plane so that the entire image plane of the object as a whole, would be sharply defined in focus on the film.

If the photographer wishes to create a special effect, such as a portrait picture with a blurred peripheral outline, he can accomplish this by simply varying the field curvature to render the peripheral area of the object scene out of focus. Because the curvature of field can be varied continuously and selectively as desired by the photographer, a highly adaptable lens system is provided in one lens barrel. This can be accomplished with a relatively easy manufactured and assembled lens system.

Finally, the present lens system could also be applied to a television camera of the type having a curved light receptive surface. Thus, the present lens system could be incorporated so that curvature of field could be preadjusted according to the desired image plane so that a flat object will copy the curvature of the light receptive surface.

In the above three embodiments, it should be noted that each embodiment has a first lens element of overall positive refractive power, a second lens element of overall negative refractive power located next to the first lens element, at the image side thereof, and a third lens element of overall positive refractive power located next to the second lens element at the image side thereof. The above powers of the first, second and third lens elements are realized by the positive lens 2 formed by $r_{19}$ and $r_{20}$, the negative lens 4 formed by $r_{21}$ and $r_{22}$, and the positive lens 6 formed by $r_{23}$ and $r_{24}$, respectively, in the first embodiment of FIG. 1.

In the second embodiment of FIG. 4, the above-mentioned first, second and third lens elements correspond to the positive lens 8 formed by $r_{15}$ and $r_{16}$, the negative lens 10 formed by $r_{17}$ and $r_{18}$ and the positive lens VIIb formed by $r_{19}$ and $r_{20}$, respectively. The third embodiment of FIG. 7 consists of the above-mentioned first, second and third lens elements which are the positive lens 12 formed by $r_1$ and $r_2$, the negative lens 14 formed by $r_3$ and $r_4$ and the positive lens 16 formed by $r_5$ and $r_6$, respectively.

The first lens element of positive refractive power and the second lens element of negative refractive power form a simple lens combination suitable for making ray traces which enter the first lens element in parallel with the optical axis, remain parallel to the optical axis between the second and third lens elements and the rays are not given any radical variation in aberrations upon their transmission through the first and second lens elements. The reason for the power of the third lens element being positive is that rays entering the third lens element should be refracted by it to provide a final convergent ray trace.

In the above arrangement of the first, second and third lens elements, the location on the front surface of the third lens element at which a light ray from an object on the optical axis at infinity enters is maintained constant when the first and second lens elements are moved, because the light ray is parallel with the optical axis as shown by the ray traces of FIG. 7. Therefore, the third lens element will act on the light ray with an approximately identical refractive power even if the first and second lens elements are moved. This maintains the corrected spherical aberration and the back focal distance of the lens system despite the movement of the first and second lens elements.

However, an off-axial ray which is from an object off the optical axis runs at an angle to the optical axis in the space formed between the second and third lens elements as shown by ray traces in FIG. 7. Therefore, a location on the front surface on the third lens element at which such an off-axial ray enters will be varied in response to the movement of the first and second lens elements, and the effect of the refractive power of the third lens element with respect to such an off-axial ray varies (e.g., such an off-axial ray is refracted strongly if it enters the marginal area of the third lens element, and refracted weakly if it enters the central area of the third lens element). This effect varies the astigmatism which is the aberration for the off-axial pencil. Thus, the curvature of field is varied in accordance with the movement of the first and second lens elements without any significant change in the spherical aberration and the back focal distance.

Various modifications and alternative embodiments of the present invention could be accomplished within the scope of the present invention by a person skilled in the optical field.

Accordingly, the present invention should be measured solely from the following claims, in which I claim:

1. In a lens system for the normal transmission of flat images, the improvement of a variable field curvature capability comprising:
   at least a first lens element of positive refractive power positioned within the lens system to receive incident optical ray traces of an object at infinity that are approximately parallel with an optical axis of the lens system;
   a second lens element of negative refractive power located adjacent the image side of the first lens element; and
   a third lens element of positive refractive power located adjacent the image side of the second lens element, the relative refractive powers of the first and second lens elements being designed so that the optical ray traces from the object on the optical axis at infinity are approximately parallel with the optical axis in a space formed between the second and third lens elements, the first and second lens elements being movable as a unit relatively to the third lens elements for changing the field curvature of the lens system without varying the back focal distance of the lens system.

2. A lens system as defined in claim 1, wherein the second lens element has a rear surface concave to the image side.

3. A lens system as defined in claim 1 further comprising a compensator lens group located adjacent the first lens element on the object side thereof, the position of the compensator lens group relative to the third lens element being maintained upon a manual movement of the first and second lens element as a unit.

4. A lens system as defined in claim 3, wherein the compensator lens group includes a first lens element of negative refractive power and a second lens element of positive refractive power located on the image side of the first lens element.

5. A lens system as defined in claim 3, wherein the refractive power of the compensator lens group is designed so that the optical ray traces from an object on the optical axis at infinity run approximately parallel with the optical axis in the space formed between the compensator lens group and the first lens element.

6. A lens system as defined in claim 1, wherein the first lens element is further movable relatively to the second and third lens elements for focusing the lens system.

7. A lens system as defined in claim 3 further comprising, on the object side of the compensator lens group, a focusing lens movable for focusing and at least a variator lens being movable for varying the focal length of the lens system.

8. A lens system as defined in claim 1 further comprising, on the object side of the first lens element, a focusing lens being movable for focusing and a variator lens being movable for varying the focal length of the lens system.

9. A variable field curvature lens system comprising three lens components within the following parameters;

| Radius of Curvature | Axial Distance | Refractive Index | Abbe Number |
|---|---|---|---|
| $r_1$ 0.2062 | | | |
| | $d_1$ 0.0451 | $N_1$ 1.6172 | $v_1$ 54.0 |
| $r_2$ −4.5450 | | | |
| | $d_2$ 0.0228 | | |
| $r_3$ −0.7751 | | | |
| | $d_3$ 0.0177 | $N_2$ 1.6206 | $v_2$ 38.3 |
| $r_4$ 0.2014 | | | |
| | $d_4$ 0.0925 | | |
| $r_5$ 1.2638 | | | |
| | $d_5$ 0.0462 | $N_3$ 1.6172 | $v_3$ 54.0 |
| $r_6$ −0.7462 | | | |

* * * * *

UNITED STATES PATENT AND TRADEMARK OFFICE
CERTIFICATE OF CORRECTION

PATENT NO. : 4,231,636

DATED : November 4, 1980

INVENTOR(S) : Haruo Abe

It is certified that error appears in the above—identified patent and that said Letters Patent is hereby corrected as shown below:

Page 1, left column, beneath filing date, insert following:

[30]    Foreign Application Priority Date
         September 20, 1975 [JP]   Japan..........50-113825.

Signed and Sealed this

Nineteenth Day of May 1981

[SEAL]

*Attest:*

RENE D. TEGTMEYER

*Attesting Officer*     *Acting Commissioner of Patents and Trademarks*